US012430459B2

(12) United States Patent
Coburn, IV et al.

(10) Patent No.: US 12,430,459 B2
(45) Date of Patent: Sep. 30, 2025

(54) PLAYBACK DEVICE QUEUE ACCESS LEVELS

(71) Applicant: Sonos, Inc., Goleta, CA (US)

(72) Inventors: Arthur L. Coburn, IV, Lexington, MA (US); Andrew J. Schulert, Cambridge, MA (US)

(73) Assignee: Sonos, Inc., Goleta, CA (US)

( * ) Notice: Subject to any disclaimer, the term of this patent is extended or adjusted under 35 U.S.C. 154(b) by 0 days.

(21) Appl. No.: 18/770,428

(22) Filed: Jul. 11, 2024

(65) Prior Publication Data
US 2025/0013771 A1 Jan. 9, 2025

Related U.S. Application Data

(63) Continuation of application No. 18/449,258, filed on Aug. 14, 2023, now Pat. No. 12,039,071, which is a
(Continued)

(51) Int. Cl.
*G06F 16/24* (2019.01)
*G06F 3/0482* (2013.01)
*G06F 16/2457* (2019.01)
*G06F 16/635* (2019.01)
*G06F 16/638* (2019.01)
(Continued)

(52) U.S. Cl.
CPC ........ *G06F 21/6218* (2013.01); *G06F 3/0482* (2013.01); *G06F 16/24578* (2019.01); *G06F 16/635* (2019.01); *G06F 16/639* (2019.01); *G06F 21/10* (2013.01); *H04N 21/43615* (2013.01); *H04N 21/439* (2013.01); *H04N 21/4627* (2013.01)

(58) Field of Classification Search
CPC .......... G06F 21/6218; G06F 16/24578; G06F 16/635
See application file for complete search history.

(56) References Cited

U.S. PATENT DOCUMENTS 7,805,682 B1 * 9/2010 Lambourne ........... G06F 3/0482
715/764
8,204,890 B1 * 6/2012 Gogan ................ G06F 16/4387
709/201
(Continued)

FOREIGN PATENT DOCUMENTS

EP 3554005 B1 11/2020

OTHER PUBLICATIONS

Canadian Patent Office, Canadian Examination Report mailed on May 13, 2024, issued in connection with Canadian Application No. 3138602, 4 pages.
(Continued)

*Primary Examiner* — Loc Tran

(57) ABSTRACT

Based on a credential, an access level of a playback queue for a first control interface and a first subset and second subset of media items in the playback queue may be determined. Media items in the playback queue that were added via a second control interface may be included in the first subset. Media items that were added via a control interface different from the second control interface may be included in a second subset. Information may be provided which identifies the first subset of the media items in the playback queue and the second subset of the media items in the playback queue.

20 Claims, 11 Drawing Sheets

Related U.S. Application Data continuation of application No. 17/536,426, filed on Nov. 29, 2021, now Pat. No. 11,727,134, which is a continuation of application No. 16/448,896, filed on Jun. 21, 2019, now Pat. No. 11,188,666, which is a continuation of application No. 15/263,628, filed on Sep. 13, 2016, now Pat. No. 10,339,331, which is a continuation of application No. 13/864,075, filed on Apr. 16, 2013, now Pat. No. 9,501,533.

(51) Int. Cl.
  *G06F 21/10*    (2013.01)
  *G06F 21/62*    (2013.01)
  *H04N 21/436*   (2011.01)
  *H04N 21/439*   (2011.01)
  *H04N 21/4627*  (2011.01)

(56) References Cited

U.S. PATENT DOCUMENTS

| | | |
|---|---|---|
| 8,341,037 B2 | 12/2012 | Bachman et al. |
| 11,687,586 B2 | 6/2023 | Kumar et al. |
| 11,899,712 B2 | 2/2024 | Coburn, IV et al. |
| 2008/0005179 A1* | 1/2008 | Friedman ............... G06F 16/68 |
| 2009/0113301 A1 | 4/2009 | Fisher et al. |
| 2011/0202842 A1 | 8/2011 | Weatherly et al. |
| 2013/0054863 A1 | 2/2013 | Imes et al. |
| 2013/0086474 A1 | 4/2013 | Oliver et al. |
| 2013/0191454 A1 | 7/2013 | Oliver et al. |
| 2013/0263192 A1 | 10/2013 | Woxblom et al. |
| 2016/0283192 A1 | 9/2016 | Friesen et al. |
| 2017/0195266 A1 | 7/2017 | Moyers |
| 2021/0216587 A1 | 7/2021 | Kumar et al. |

OTHER PUBLICATIONS

European Patent Office, European EPC Article 94.3 mailed on Dec. 10, 2024, issued in connection with European Application No. 22181265.4, 7 pages.

European Patent Office, European EPC Article 94.3 mailed on Mar. 17, 2025, issued in connection with European Application No. 20206300.4, 4 pages.

European Patent Office, European EPC Article 94.3 mailed on Mar. 19, 2025, issued in connection with European Application No. 22179278.1, 5 pages.

European Patent Office, European EPC Article 94.3 mailed on Oct. 24, 2024, issued in connection with European Application No. 21209669.7, 21 pages.

European Patent Office, European EPC Article 94.3 mailed on Oct. 24, 2024, issued in connection with European Application No. 21209669.7, 4 pages.

European Patent Office, Summons to Attend Oral Proceedings mailed on Jul. 26, 2024, issued in connection with European Application No. 20159841.4, 13 pages.

Final Office Action mailed on Apr. 25, 2025, issued in connection with U.S. Appl. No. 18/453,016, filed Aug. 21, 2023, 30 pages.

Non-Final Office Action mailed on Oct. 8, 2024, issued in connection with U.S. Appl. No. 18/439,484, filed Feb. 12, 2024, 18 pages.

Non-Final Office Action mailed on Dec. 12, 2024, issued in connection with U.S. Appl. No. 18/453,016, filed Aug. 21, 2023, 31 pages.

Non-Final Office Action mailed on Nov. 21, 2024, issued in connection with U.S. Appl. No. 17/145,268, filed Nov. 13, 2023, 16 pages.

Non-Final Office Action mailed on Jun. 5, 2024, issued in connection with U.S. Appl. No. 17/861,890, filed Jul. 11, 2022, 22 pages.

Notice of Allowance mailed on Jan. 16, 2025, issued in connection with U.S. Appl. No. 17/861,890, filed Jul. 11, 2022, 9 pages.

Notice of Allowance mailed on Mar. 20, 2024, issued in connection with U.S. Appl. No. 18/339,880, filed Jun. 22, 2023, 8 pages.

Notice of Allowance mailed on Feb. 25, 2025, issued in connection with U.S. Appl. No. 18/439,484, filed Feb. 12, 2024, 9 pages.

Notice of Allowance mailed on Feb. 28, 2024, issued in connection with U.S. Appl. No. 17/710,425, filed Mar. 31, 2022, 7 pages.

Notice of Allowance mailed on Mar. 4, 2024, issued in connection with U.S. Appl. No. 18/449,258, filed Aug. 14, 2023, 11 pages.

Notice of Allowance mailed on Jun. 5, 2024, issued in connection with U.S. Appl. No. 17/145,268, filed Jan. 8, 2021, 7 pages.

U.S. Appl. No. 13/904,896, filed May 29, 2013, "Playback queue control via a playlist on a mobile device" Kumar et al.

* cited by examiner

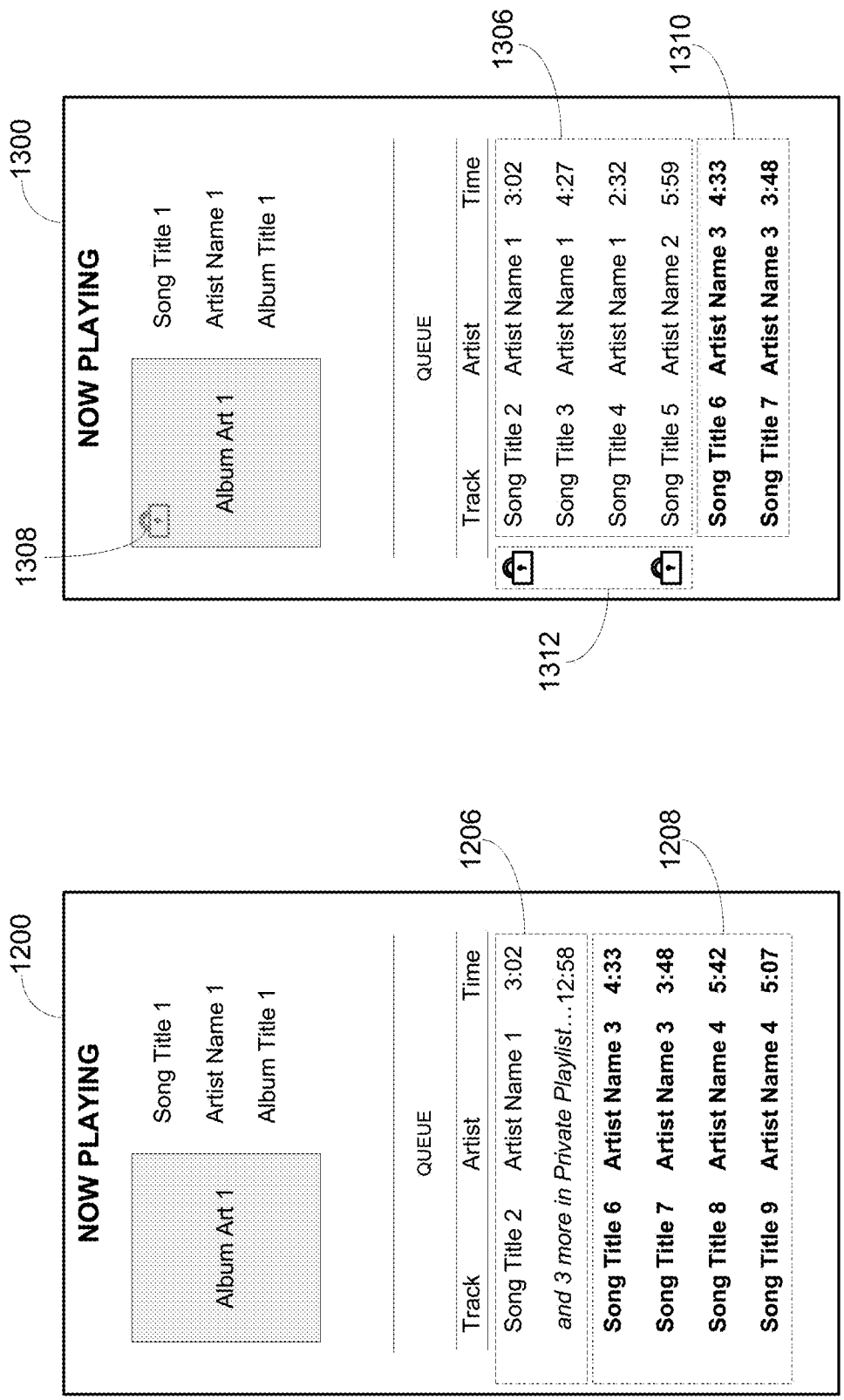

PLAYBACK DEVICE QUEUE ACCESS LEVELS

CROSS REFERENCE TO RELATED APPLICATION

This disclosure claims the benefit of priority as a continuation under 35 U.S.C. § 120 to U.S. application Ser. No. 18/449,258 entitled "Playback Device Queue Access Levels" filed on Aug. 14, 2023, which is a continuation of U.S. application Ser. No. 17/536,426 entitled "Playback Device Queue Access Levels" filed on Nov. 29, 2021, which is a continuation of U.S. application Ser. No. 16/448,896 entitled "Playback Device Queue Access Levels" filed on Jun. 21, 2019, which is a continuation of U.S. application Ser. No. 15/263,628 entitled "Playback Device Queue Access Levels" filed on Sep. 13, 2016, which is a continuation of U.S. application Ser. No. 13/864,075 entitled "Private Queue for a Media Playback System" filed on Apr. 16, 2013, the contents of each of which is hereby incorporated by reference in its entirety.

FIELD OF THE DISCLOSURE

The disclosure is related to consumer goods and, more particularly, to methods, systems, products, features, services, and other items directed to media playback or some aspect thereof.

BACKGROUND

Digital music has become readily available due in part to the development of consumer level technology that has allowed people to listen to digital music on a personal audio device. The consumer's increasing preference for digital audio has also resulted in the integration of personal audio devices into PDAs, cellular phones, and other mobile devices. The portability of these mobile devices has enabled people to take the music listening experience with them and outside of the home. People have become able to consume digital music, like digital music files or even Internet radio, in the home through the use of their computer or similar devices. Now there are many different ways to consume digital music, in addition to other digital content including digital video and photos, stimulated in many ways by high-speed Internet access at home, mobile broadband Internet access, and the consumer's hunger for digital media.

Until recently, options for accessing and listening to digital audio in an out-loud setting were severely limited. In 2005, Sonos offered for sale its first digital audio system that enabled people to, among many other things, access virtually unlimited sources of audio via one or more networked connected zone players, dynamically group or ungroup zone players upon command, wirelessly send the audio over a local network amongst zone players, and play the digital audio out loud in synchrony. The Sonos system can be controlled by software applications downloaded to certain network capable, mobile devices and computers.

Given the insatiable appetite of consumers towards digital media, there continues to be a need to develop consumer technology that revolutionizes the way people access and consume digital media.

BRIEF DESCRIPTION OF THE DRAWINGS

Features, aspects, and advantages of the presently disclosed technology may be better understood with regard to the following description, appended claims, and accompanying drawings where:

FIG. 10C shows a third example media playback system interface showing a private playback queue; and FIG. 10D shows a fourth example media playback system interface showing a private playback queue.

Figure 1:
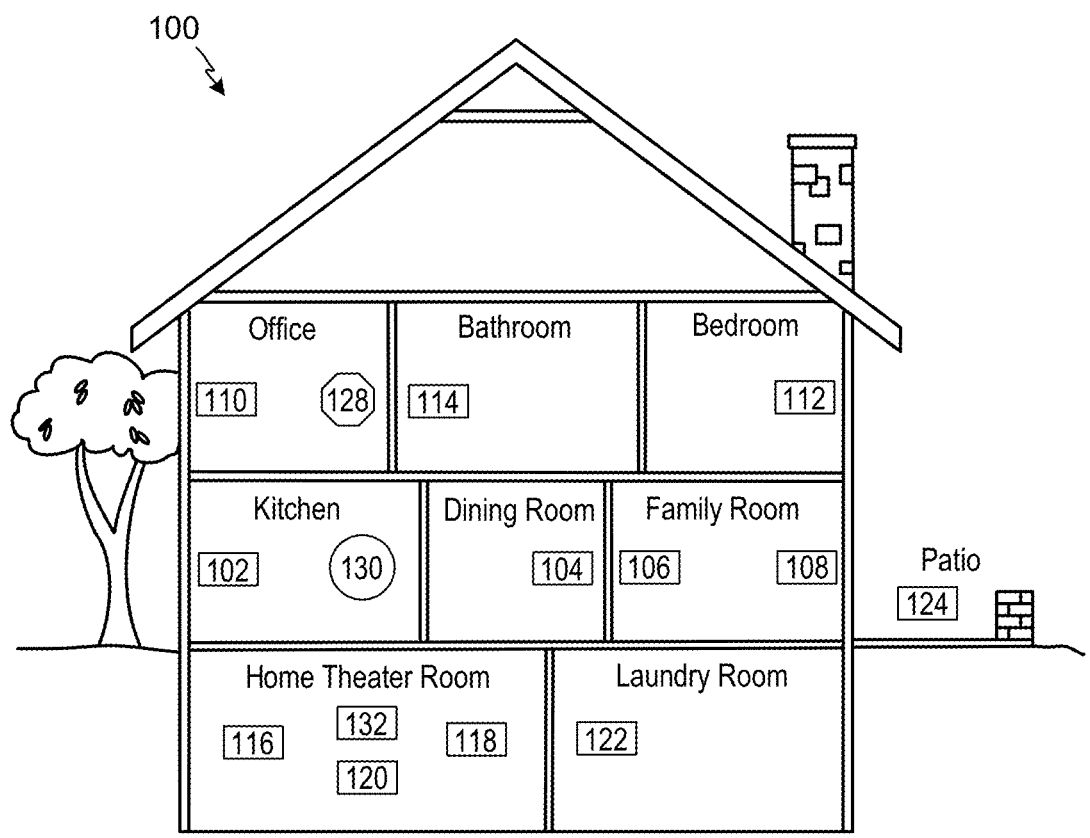
FIG. 1 shows an example configuration in which certain embodiments may be practiced.

In addition, the drawings are for the purpose of illustrating example embodiments, but it is understood that the inventions are not limited to the arrangements and instrumentality shown in the drawings.

DETAILED DESCRIPTION a. Overview

Embodiments described herein involve providing private playback queues in a media playback system. For example, a first user may add songs or a playlist of songs to a playback queue of a zone via a first user interface. The first user interface may be provided on a computer or mobile device, and may be an application for accessing the media playback system, or an application for accessing a music service that is also accessible by the media playback system. In some cases, the queue of the zone may be viewed and modified by any other user accessing the queue using a user interface configured for the media playback system. In other cases, as described herein, contents added to playback queue by the first user may be private to the first user, and may not be fully viewed or modified by a second user, even if the second user is accessing the zone via a user interface configured for the media playback system.

In one instance, privacy of the queue or music in the queue may be determined based on media playback system settings, preferences of the first user, and/or a credential of a second user accessing queue. In one example, the first user may choose to keep private all music the first user has added to the playback queue. In this case, the second user accessing the queue via an interface may be provided with an indication that the queue includes music added by the first user (by name or anonymously), without additional information on music that has been added to the queue. In another case, the second user accessing the playback queue may be provided with an indication of music that is currently playing (for example, "now playing" as shown relative to the name of the item playing via a controller interface), without additional information on other music that has been added to the queue by the first user.

In another example, the second user accessing the queue may be provided with different amounts of information based on a credential of the second user. The credential of the second user may include music service access rights of the second user and/or media playback system access rights. For instance, if the first user added music to the queue using an application associated with a music service, the second user may be provided at least some information on music added to the queue by the first user if the second user has access to the music service. In another instance, the second user may be provided at least some information on the music added to the queue by the first user if the second user has access to the zone associated with the queue. The amount and type of information provided to the second user in this case, may be based on preferences of the first user as well as the credential of the second user. Other examples may also be possible.

As indicated above, the present application involves providing one or more private playback queues in a media playback system such that users without access rights to a playback queue may not access the contents of the playback queue. The method involves receiving by a network media system a playlist responsive to an instruction via a first controller interface. The network media system comprises a zone that includes a playback device and a playback queue. The playlist identifies one or more media items that are available for playback. The method further involves adding the playlist to a playback queue associated with the zone. The playback queue is established to contain information identifying one or more media items to be played by the zone. The method also involves receiving a request from a second controller interface for the information identifying the one or more items in the playback queue, determining that the second controller interface lacks a credentials to receive the information identifying the one or more items in the playback queue, and providing the information identifying a subset of the one or more items in the playback queue to the second controller interface.

In another aspect, a non-transitory computer readable memory is provided. The non-transitory computer readable memory has stored thereon instructions executable by a computing device to cause the computing device to execute functions. The functions include receiving at a by network media system a playlist responsive to an instruction via a first controller interface. The network media system comprises a zone that includes a playback device and a playback queue. The playlist identifies one or more media items that are available for playback. The functions further involve adding the playlist to a playback queue associated with the zone. The playback queue is established to contain information identifying one or more media items to be played by the zone. The functions also involve receiving a request from a second controller interface for the information identifying the one or more items in the playback queue, determining that the second controller interface lacks a credentials to receive the information identifying the one or more items in the playback queue, and providing the information identifying a subset of the one or more items in the playback queue to the second controller interface.

In another aspect, a device is provided. The device includes a processor and computer readable medium having stored thereon instructions executable by the processor to perform function. The functions include receiving by a network media system a playlist responsive to an instruction via a first controller interface. The network media system comprises a zone that includes a playback device and a playback queue. The playlist identifies one or more media items that are available for playback. The functions further involve adding the playlist to a playback queue associated with the zone. The playback queue is established to contain information identifying one or more media items to be played by the zone. The functions also involve receiving a request from a second controller interface for the information identifying the one or more items in the playback queue, determining that the second controller interface lacks a credentials to receive the information identifying the one or more items in the playback queue, and providing the information identifying a subset of the one or more items in the playback queue to the second controller interface.

Other embodiments, as those discussed in the following and others as can be appreciated by one having ordinary skill in the art are also possible.

II. EXAMPLE OPERATING ENVIRONMENT

Referring now to the drawings, in which like numerals can refer to like parts throughout the figures, FIG. 1 shows an example media system configuration 100 in which one or more embodiments disclosed herein can be practiced or implemented.

By way of illustration, the media system configuration 100 is associated with a home having multiple zones, though the home could have been configured with only one zone. Additionally, one or more zones can be added over time. Each zone may be assigned by a user to a different room or space, such as, for example, an office, bathroom, bedroom, kitchen, dining room, family room, home theater room, utility or laundry room, and patio. A single zone might also include multiple rooms or spaces if so configured. With respect to FIG. 1, one or more of zone players 102-124 are shown in each respective zone. A zone player 102-124, also referred to herein as a playback device, multimedia unit, speaker, player, and so on, provides audio, video, and/or audiovisual output. A controller 130 (e.g., shown in the kitchen for purposes of this illustration) provides control to the media system configuration 100. Controller 130 may be fixed to a zone, or alternatively, mobile such that it can be moved about the zones. The media system configuration 100 may also include more than one controller 130, and additional controllers may be added to the system over time.

The media system configuration 100 illustrates an example whole house media system, though it is understood that the technology described herein is not limited to, among other things, its particular place of application or to an expansive system like a whole house media system 100 of FIG. 1.

a. Example Zone Players

Figure 2A:
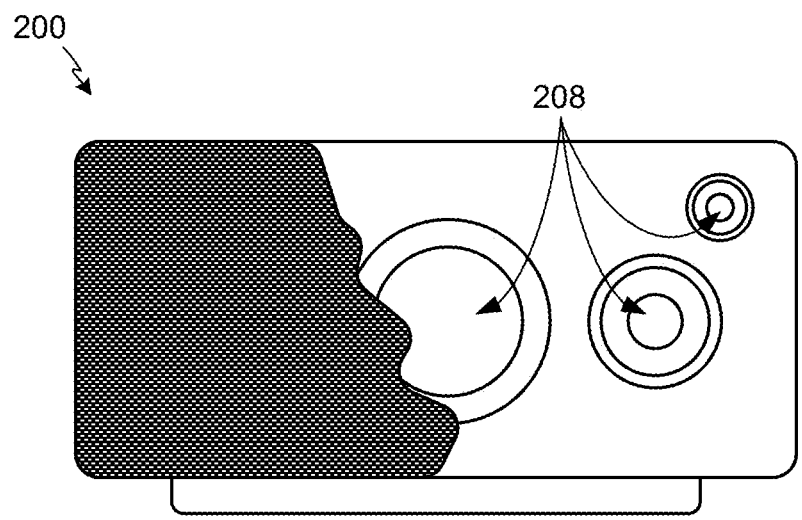
FIG. 2A shows an illustration of an example zone player having a built-in amplifier and transducers.
Figure 2B:
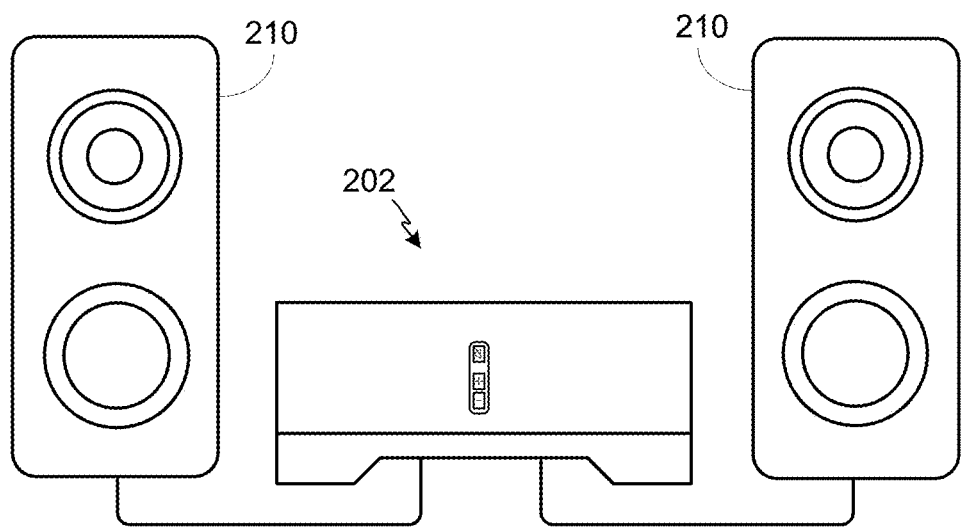
FIG. 2B shows an illustration of an example zone player having a built-in amplifier and connected to external speakers.
Figure 2C:
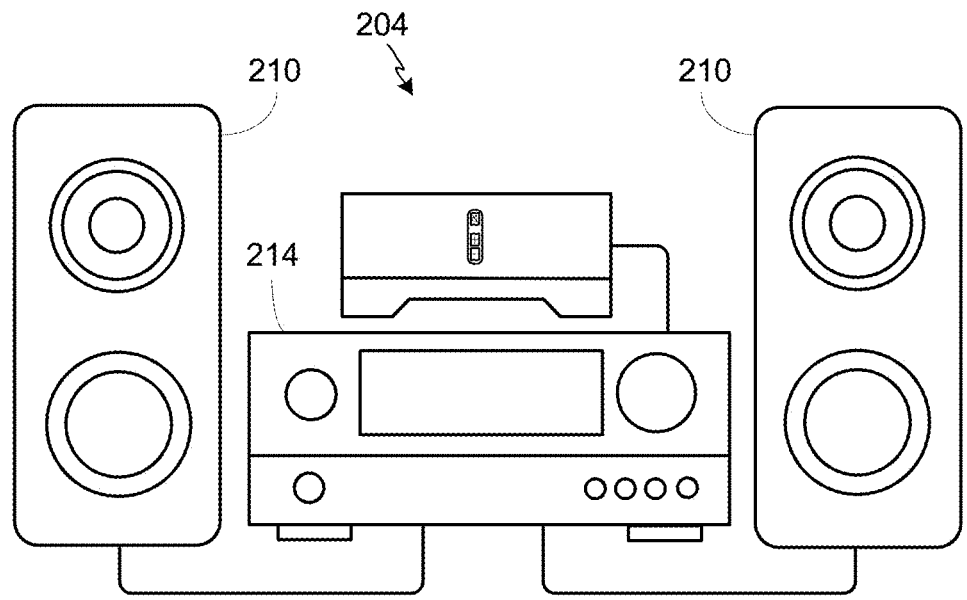
FIG. 2C shows an illustration of an example zone player connected to an A/V receiver and speakers.

FIGS. 2A, 2B, and 2C show example types of zone players. Zone players 200, 202, and 204 of FIGS. 2A, 2B, and 2C, respectively, can correspond to any of the zone players 102-124 of FIG. 1, for example. In some embodiments, audio is reproduced using only a single zone player, such as by a full-range player. In some embodiments, audio is reproduced using two or more zone players, such as by using a combination of full-range players or a combination of full-range and specialized players. In some embodiments, zone players 200-204 may also be referred to as a "smart speaker," because they contain processing capabilities beyond the reproduction of audio, more of which is described below.

FIG. 2A illustrates zone player 200 that includes sound producing equipment 208 capable of reproducing full-range sound. The sound may come from an audio signal that is received and processed by zone player 200 over a wired or wireless data network. Sound producing equipment 208 includes one or more built-in amplifiers and one or more acoustic transducers (e.g., speakers). A built-in amplifier is described more below with respect to FIG. 4. A speaker or acoustic transducer can include, for example, any of a tweeter, a mid-range driver, a low-range driver, and a subwoofer. In some embodiments, zone player 200 can be statically or dynamically configured to play stereophonic audio, monaural audio, or both. In some embodiments, zone player 200 may be dynamically configured to reproduce a subset of full-range sound, such as when zone player 200 is grouped with other zone players to play stereophonic audio, monaural audio, and/or surround audio or when the audio content received by zone player 200 is less than full-range.

FIG. 2B illustrates zone player 202 that includes a built-in amplifier to power a set of detached speakers 210. A detached speaker can include, for example, any type of loudspeaker. Zone player 202 may be configured to power one, two, or more separate loudspeakers. Zone player 202 may be configured to communicate an audio signal (e.g., right and left channel audio or more channels depending on its configuration) to the detached speakers 210 via a wired path.

FIG. 2C illustrates zone player 204 that does not include a built-in amplifier, but is configured to communicate an audio signal, received over a data network, to an audio (or "audio/video") receiver 214 with built-in amplification.

Referring back to FIG. 1, in some embodiments, one, some, or all of the zone players 102 to 124 can retrieve audio directly from a source. For example, a particular zone player in a zone or zone group may be assigned to a playback queue (or "queue"). The playback queue contains information corresponding to zero or more playable audio items by the associated zone or zone group. The playback queue may be stored in memory on a zone player or some other designated device. Each item contained in the playback queue may comprise a uniform resource identifier (URI) or some other identifier that can be used by the zone player(s) to seek out and/or retrieve the audio items from the identified audio source(s). Depending on the item, the audio source might be found on the Internet (e.g., the cloud), locally from another device over the data network 128 (described further below), from the controller 130, stored on the zone player itself, or from an audio source communicating directly to the zone player. In some embodiments, the zone player can reproduce the audio itself (e.g., play the audio), send the audio to another zone player for reproduction, or both where the audio is reproduced by the zone player as well as one or more additional zone players (possibly in synchrony). In some embodiments, the zone player may play a first audio content (or alternatively, may not play the content at all), while sending a second, different audio content to another zone player(s) for reproduction. To the user, each item in a playback queue is represented on an interface of a controller by an element such as a track name, album name, playlist, or other some other representation. A user can populate the playback queue with audio items of interest. The user may also modify and clear the playback queue, if so desired.

By way of illustration, SONOS, Inc. of Santa Barbara, California presently offers for sale zone players referred to as a "PLAY:5," "PLAY:3," "PLAYBAR," "CONNECT: AMP," "CONNECT," and "SUB." Any other past, present, and/or future zone players can additionally or alternatively be used to implement the zone players of example embodiments disclosed herein. Additionally, it is understood that a zone player is not limited to the particular examples illustrated in FIGS. 2A, 2B, and 2C or to the SONOS product offerings. For example, a zone player may include a wired or wireless headphone. In yet another example, a zone player might include a sound bar for television. In yet another example, a zone player may include or interact with a docking station for an Apple IPOD™ or similar device.

b. Example Controllers

Figure 3:
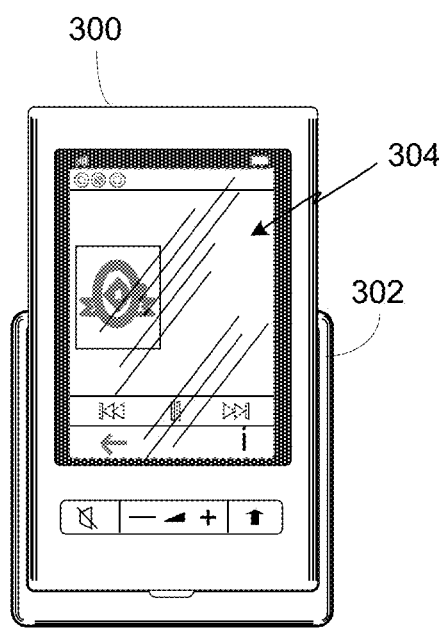
FIG. 3 shows an illustration of an example controller.

FIG. 3 illustrates an example wireless controller 300 in docking station 302. By way of illustration, controller 300 may correspond to controlling device 130 of FIG. 1. Docking station 302, if provided or used, may provide power to the controller 300 and additionally may charge a battery of controller 300. In some embodiments, controller 300 may be provided with a touch screen 304 that allows a user to interact through touch with the controller 300, for example, to retrieve and navigate a playlist of audio items, control operations of one or more zone players, and provide overall control of the system configuration 100. In other embodiments, other input mechanisms such as voice control may be used to interact with the controller 300. In certain embodiments, any number of controllers can be used to control the system configuration 100. In some embodiments, there may be a limit set on the number of controllers that can control the system configuration 100. The controllers might be wireless like wireless controller 300 or wired to data network 128.

In some embodiments, if more than one controller is used in system 100 of FIG. 1, each controller may be coordinated to display common content, and may all be dynamically updated to indicate changes made to the system 100 from a single controller. Coordination can occur, for instance, by a controller periodically requesting a state variable directly or indirectly from one or more of the zone players; the state variable may provide information about system 100, such as current zone group configuration, what is playing in one or more zones, volume levels, and other items of interest. The state variable may be passed around on data network 128 between zone players (and controllers, if so desired) as needed or as often as programmed.

In addition, an application running on any network-enabled portable device, such as an IPHONE™, IPAD™, ANDROID™ powered phone or tablet, or any other smart phone or network-enabled device can be used as controller 130. An application running on a laptop or desktop personal computer (PC) or Mac™ can also be used as controller 130. Such controllers may connect to system 100 through an interface with data network 128, a zone player, a wireless router, or using some other configured connection path. Example controllers offered by Sonos, Inc. of Santa Barbara, California include a "Controller 200," "SONOS® CONTROL," "SONOS® Controller for IPHONE™," "SONOS® Controller for IPAD™," "SONOS® Controller for ANDROID™," "SONOS® Controller for MAC™ or PC."

c. Example Data Connection

Zone players 102 to 124 of FIG. 1 are coupled directly or indirectly to a data network, such as data network 128. Controller 130 may also be coupled directly or indirectly to data network 128 or individual zone players. Data network 128 is represented by an octagon in the figure to stand out from other representative components. While data network 128 is shown in a single location, it is understood that such a network is distributed in and around system 100. Particularly, data network 128 can be a wired network, a wireless network, or a combination of both wired and wireless networks. In some embodiments, one or more of the zone players 102-124 are wirelessly coupled to data network 128 based on a proprietary mesh network. In some embodiments, one or more of the zone players are coupled to data network 128 using a centralized access point such as a wired or wireless router. In some embodiments, one or more of the zone players 102-124 are coupled via a wire to data network 128 using Ethernet or similar technology. In addition to the one or more zone players 102-124 connecting to data network 128, data network 128 can further allow access to a wide area network, such as the Internet.

In some embodiments, connecting any of the zone players 102-124, or some other connecting device, to a broadband router, can create data network 128. Other zone players 102-124 can then be added wired or wirelessly to the data network 128. For example, a zone player (e.g., any of zone players 102-124) can be added to the system configuration 100 by simply pressing a button on the zone player itself (or perform some other action), which enables a connection to be made to data network 128. The broadband router can be connected to an Internet Service Provider (ISP), for example. The broadband router can be used to form another data network within the system configuration 100, which can be used in other applications (e.g., web surfing). Data network 128 can also be used in other applications, if so programmed. An example, second network may implement SONOSNET™ protocol, developed by SONOS, Inc. of Santa Barbara. SONOSNET™ represents a secure, AES-encrypted, peer-to-peer wireless mesh network. Alternatively, in certain embodiments, the data network 128 is the same network, such as a traditional wired or wireless network, used for other applications in the household.

d. Example Zone Configurations

A particular zone can contain one or more zone players. For example, the family room of FIG. 1 contains two zone players 106 and 108, while the kitchen is shown with one zone player 102. In another example, the home theater room contains additional zone players to play audio from a 5.1 channel or greater audio source (e.g., a movie encoded with 5.1 or greater audio channels). In some embodiments, one can position a zone player in a room or space and assign the zone player to a new or existing zone via controller 130. As such, zones may be created, combined with another zone, removed, and given a specific name (e.g., "Kitchen"), if so desired and programmed to do so with controller 130. Moreover, in some embodiments, zone configurations may be dynamically changed even after being configured using controller 130 or some other mechanism.

In some embodiments, if a zone contains two or more zone players, such as the two zone players 106 and 108 in the family room, then the two zone players 106 and 108 can be configured to play the same audio source in synchrony, or the two zone players 106 and 108 can be paired to play two separate sounds in left and right channels, for example. In other words, the stereo effects of a sound can be reproduced or enhanced through the two zone players 106 and 108, one for the left sound and the other for the right sound. In certain embodiments, paired zone players (also referred to as "bonded zone players") can play audio in synchrony with other zone players in the same or different zones.

In some embodiments, two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player will have additional speaker drivers from which sound can be passed. The consolidated zone player can further be paired with a single zone player or yet another consolidated zone player. Each playback device of a consolidated playback device can be set in a consolidated mode, for example.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and reconnecting speaker wire, for example, to individual, discrete speakers to create different configurations. As such, certain embodiments described herein provide a more flexible and dynamic platform through which sound reproduction can be offered to the end-user.

e. Example Audio Sources

In some embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for someone to pass through zones while seamlessly (or substantially seamlessly) listening to the audio. Further, zones can be put into a "party mode" such that all associated zones will play audio in synchrony.

Sources of audio content to be played by zone players 102-124 are numerous. In some embodiments, audio on a zone player itself may be accessed and played. In some embodiments, audio on a controller may be accessed via the data network 128 and played. In some embodiments, music from a personal library stored on a computer or networked-attached storage (NAS) may be accessed via the data network 128 and played. In some embodiments, Internet radio stations, shows, and podcasts may be accessed via the data network 128 and played. Music or cloud services that let a user stream and/or download music and audio content may be accessed via the data network 128 and played. Further, music may be obtained from traditional sources, such as a turntable or CD player, via a line-in connection to a zone player, for example. Audio content may also be accessed using a different protocol, such as AIRPLAY™, which is a wireless technology by Apple, Inc., for example. Audio content received from one or more sources can be shared amongst the zone players 102 to 124 via data network 128 and/or controller 130. The above-disclosed sources of audio content are referred to herein as network-based audio information sources. However, network-based audio information sources are not limited thereto.

In some embodiments, the example home theater zone players 116, 118, 120 are coupled to an audio information source such as a television 132. In some examples, the television 132 is used as a source of audio for the home theater zone players 116, 118, 120, while in other examples audio information from the television 132 may be shared with any of the zone players 102-124 in the audio system 100.

III. EXAMPLE ZONE PLAYERS

Figure 4:
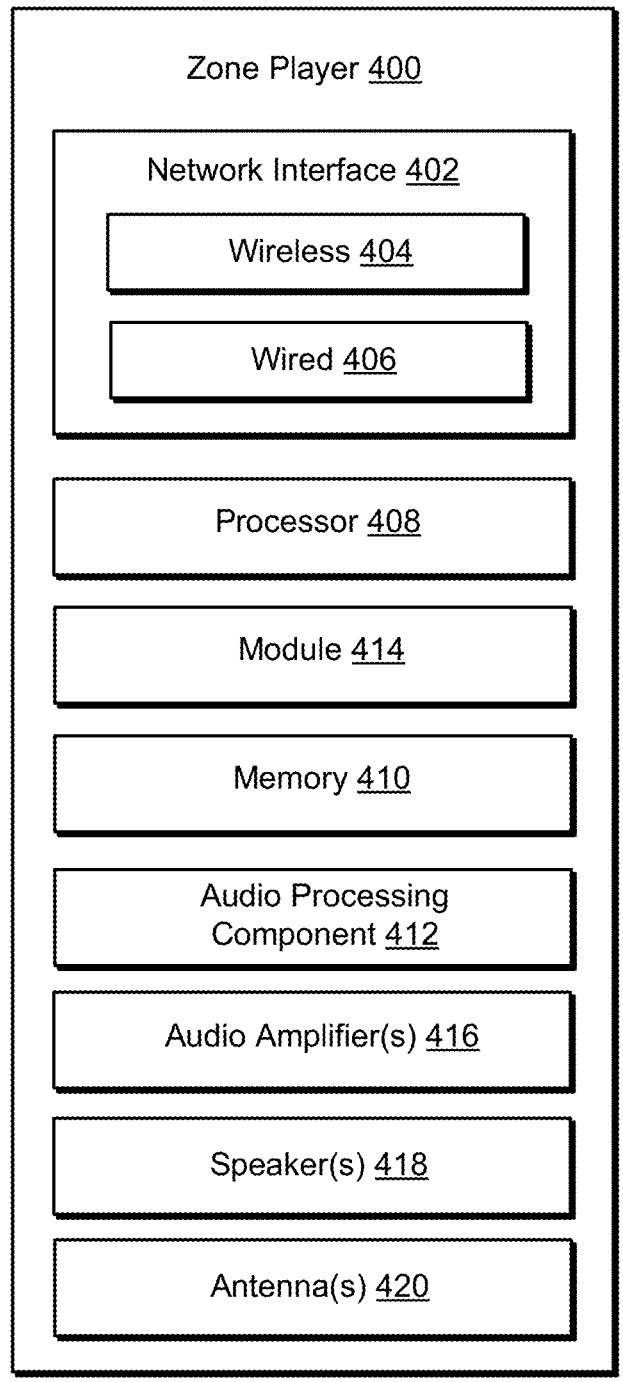
FIG. 4 shows an internal functional block diagram of an example zone player.

Referring now to FIG. 4, there is shown an example block diagram of a zone player 400 in accordance with an embodiment. Zone player 400 includes a network interface 402, a processor 408, a memory 410, an audio processing component 412, one or more modules 414, an audio amplifier 416, and a speaker unit 418 coupled to the audio amplifier 416. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a television, lighting, or some other device for indoor or outdoor use.

In some embodiments, network interface 402 facilitates a data flow between zone player 400 and other devices on a data network 128. In some embodiments, in addition to getting audio from another zone player or device on data network 128, zone player 400 may access audio directly from the audio source, such as over a wide area network or on the local network. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, network interface 402 can include one or both of a wireless interface 404 and a wired interface 406. The wireless interface 404, also referred to as a radio frequency (RF) interface, provides network interface functions for the zone player 400 to wirelessly communicate with other devices (e.g., other zone player(s), speaker(s), receiver(s), component(s) associated with the data network 128, and so on) in accordance with a communication protocol (e.g., any wireless standard including IEEE 802.11a, 802.11b, 802.11g, 802.11n, 802.15, 4G mobile communication standard, and so on). Wireless interface 404 may include one or more radios. To receive wireless signals and to provide the wireless signals to the wireless interface 404 and to transmit wireless signals, the zone player 400 includes one or more antennas 420. The wired interface 406 provides network interface functions for the zone player 400 to communicate over a wire with other devices in accordance with a communication protocol (e.g., IEEE 802.3). In some embodiments, a zone player includes multiple wireless 404 interfaces. In some embodiments, a zone player includes multiple wired 406 interfaces. In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software module(s) 414, which can be executed by the processor 408 to achieve certain tasks. In the illustrated embodiment, the memory 410 is a tangible machine-readable medium storing instructions that can be executed by the processor 408. In some embodiments, a task might be for the zone player 400 to retrieve audio data from another zone player or a device on a network (e.g., using a uniform resource locator (URL) or some other identifier). In some embodiments, a task may be for the zone player 400 to send audio data to another zone player or device on a network. In some embodiments, a task may be for the zone player 400 to synchronize playback of audio with one or more additional zone players. In some embodiments, a task may be to pair the zone player 400 with one or more zone players to create a multi-channel audio environment. Additional or alternative tasks can be achieved via the one or more software module(s) 414 and the processor 408.

The audio processing component 412 can include one or more digital-to-analog converters (DAC), an audio preprocessing component, an audio enhancement component or a digital signal processor, and so on. In some embodiments, the audio processing component 412 may be part of processor 408. In some embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for playback through speakers 418. In addition, the audio processing component 412 can include circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device(s) that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (e.g., for low frequencies), a mid-range driver (e.g., for middle frequencies), and a tweeter (e.g., for high frequencies), for example. An enclosure can be sealed or ported, for example. Each transducer may be driven by its own individual amplifier.

A commercial example, presently known as the PLAY:5™, is a zone player with a built-in amplifier and speakers that is capable of retrieving audio directly from the source, such as on the Internet or on the local network, for example. In particular, the PLAY:5™ is a five-amp, five-driver speaker system that includes two tweeters, two mid-range drivers, and one woofer. When playing audio content via the PLAY:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies but from different channels of audio. Audio from Internet radio stations, online music and video services, downloaded music, analog audio inputs, television, DVD, and so on, can be played from the PLAY:5™.

IV. Example Controller

Figure 5:
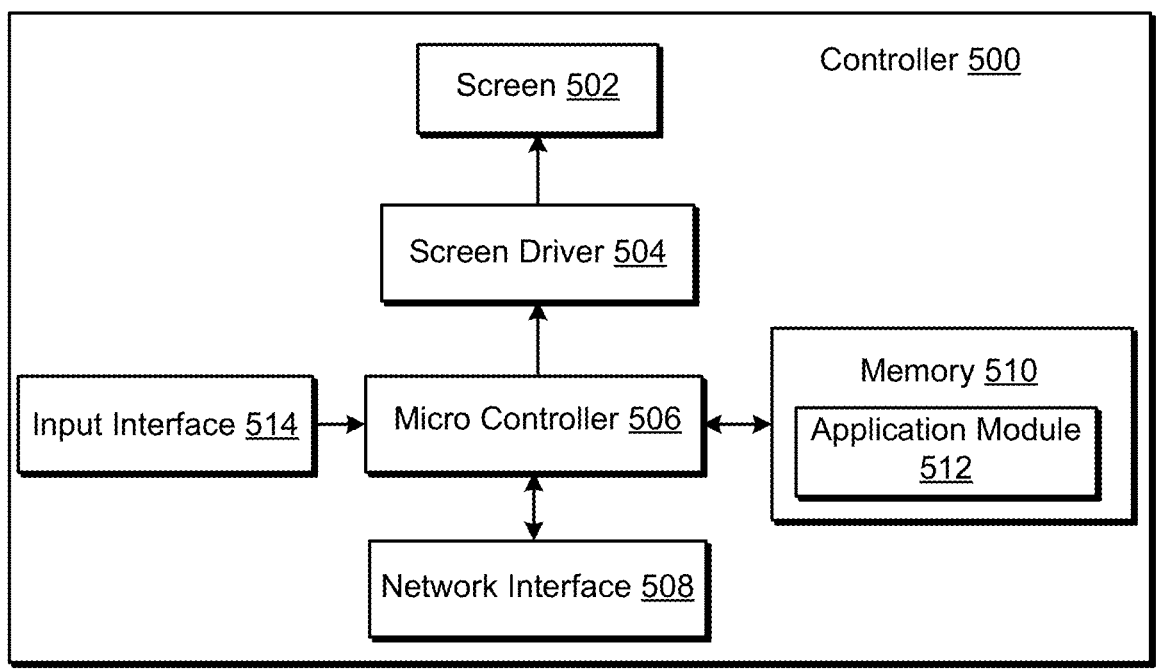
FIG. 5 shows an internal functional block diagram of an example controller.

Referring now to FIG. 5, there is shown an example block diagram for controller 500, which can correspond to the controlling device 130 in FIG. 1. Controller 500 can be used to facilitate the control of multi-media applications, automation and others in a system. In particular, the controller 500 may be configured to facilitate a selection of a plurality of audio sources available on the network and enable control of one or more zone players (e.g., the zone players 102-124 in FIG. 1) through a wireless or wired network interface 508. According to one embodiment, the wireless communications is based on an industry standard (e.g., infrared, radio, wireless standards including IEEE 802.11a, 802.11b, 802.11g, 802.11n, 802.15, 4G mobile communication standard, and so on). Further, when a particular audio is being accessed via the controller 500 or being played via a zone player, a picture (e.g., album art) or any other data, associated with the audio and/or audio source can be transmitted from a zone player or other electronic device to controller 500 for display.

Controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 500 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate grouping a number of selected zone players into a zone group and synchronizing the zone players for audio playback. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wired or wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system, and each controller may share common information with another controller, or retrieve the common information from a zone player, if such a zone player stores configuration data (e.g., such as a state variable). Further, a controller can be integrated into a zone player.

It should be noted that other network-enabled devices such as an IPHONE™, IPAD™ or any other smart phone or network-enabled device (e.g., a networked computer such as a PC or MAC™) can also be used as a controller to interact or control zone players in a particular environment. In some embodiments, a software application or upgrade can be downloaded onto a network-enabled device to perform the functions described herein.

In certain embodiments, a user can create a zone group (also referred to as a bonded zone) including at least two zone players from the controller 500. The zone players in the zone group can play audio in a synchronized fashion, such that all of the zone players in the zone group playback an identical audio source or a list of identical audio sources in a synchronized manner such that no (or substantially no) audible delays or hiccups are to be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio playback is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer.

In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would manually and individually link each zone. The single command may include a mouse click, a double mouse click, a button press, a gesture, or some other programmed or learned action. Other kinds of zone scenes can be programmed or learned by the system over time.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Playback Queue

As discussed above, in some embodiments, a zone player may be assigned to a playback queue identifying zero or more media items for playback by the zone player. The media items identified in a playback queue may be represented to the user via an interface on a controller. For instance, the representation may show the user (or users if more than one controller is connected to the system) how the zone player is traversing the playback queue, such as by highlighting the "now playing" item, graying out the previously played item(s), highlighting the to-be-played item(s), and so on.

In some embodiments, a single zone player is assigned to a playback queue. For example, zone player 114 in the bathroom of FIG. 1 may be linked or assigned to a "Bathroom" playback queue. In an embodiment, the "Bathroom" playback queue might have been established by the system as a result of the user naming the zone player 114 to the bathroom. As such, contents populated and identified in the "Bathroom" playback queue can be played via the zone player 114 (the bathroom zone).

In some embodiments, a zone or zone group is assigned to a playback queue. For example, zone players 106 and 108 in the family room of FIG. 1 may be linked or assigned to a "Family room" playback queue. In another example, if family room and dining room zones were grouped, then the new group would be linked or assigned to a family room+dining room playback queue. In some embodiments, the family room+dining room playback queue would be established based upon the creation of the group. In some embodiments, upon establishment of the new group, the family room+dining room playback queue can automatically include the contents of one (or both) of the playback queues associated with either the family room or dining room or both. In one instance, if the user started with the family room and added the dining room, then the contents of the family room playback queue would become the contents of the family room+dining room playback queue. In another instance, if the user started with the family room and added the dining room, then the family room playback queue would be renamed to the family room+dining room playback queue. If the new group was "ungrouped," then the family room+dining room playback queue may be removed from the system and/or renamed to one of the zones (e.g., renamed to "family room" or "dining room"). After ungrouping, each of the family room and the dining room will be assigned to a separate playback queue. One or more of the zone players in the zone or zone group may store in memory the associated playback queue.

As such, when zones or zone groups are "grouped" or "ungrouped" dynamically by the user via a controller, the system will, in some embodiments, establish or remove/rename playback queues respectively, as each zone or zone group is to be assigned to a playback queue. In other words, the playback queue operates as a container that can be populated with media items for playback by the assigned zone. In some embodiments, the media items identified in a playback queue can be manipulated (e.g., re-arranged, added to, deleted from, and so on).

Figure 6:
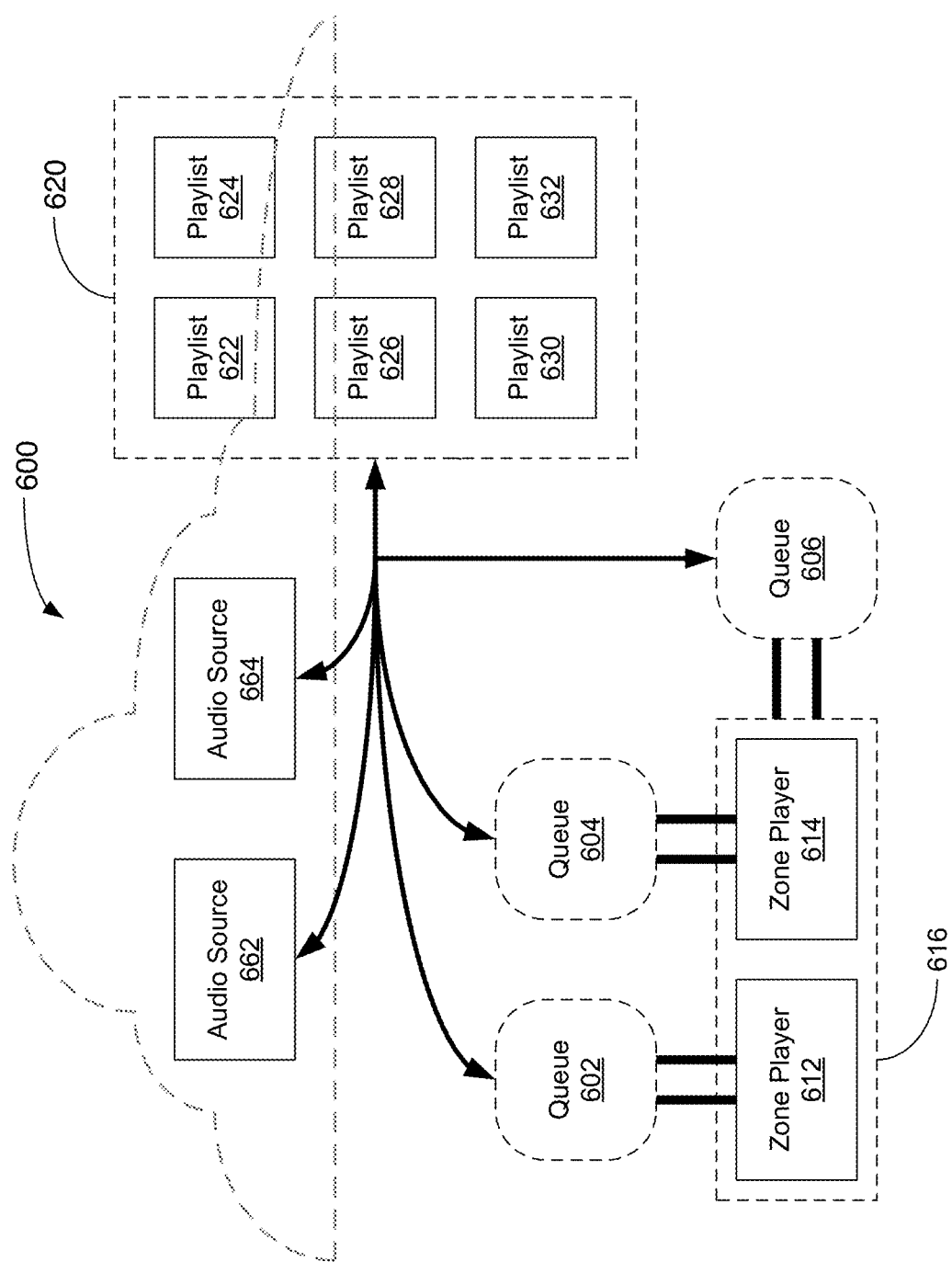
FIG. 6 shows an example playback queue configuration for a network media system.

By way of illustration, FIG. 6 shows an example network 600 for media content playback. As shown, the example network 600 includes example zone players 612 and 614, example audio sources 662 and 664, and example media items 620. The example media items 620 may include playlist 622, music track 624, favorite Internet radio station 626, playlists 628 and 630, and album 632. In one embodiment, the zone players 612 and 614 may be any of the zone players shown in FIGS. 1, 2, and 4. For instance, zone players 612 and 614 may be the zone players 106 and 108 in the Family Room.

In one example, the example audio sources 662 and 664, and example media items 620 may be partially stored on a cloud network, discussed more below in connection to FIG. 8. In some cases, the portions of the audio sources 662, 664, and example media items 620 may be stored locally on one or both of the zone players 612 and 614. In one embodiment, playlist 622, favorite Internet radio station 626, and playlist 630 may be stored locally, and music track 624, playlist 628, and album 632 may be stored on the cloud network.

Each of the example media items 620 may be a list of media items playable by a zone player(s). In one embodiment, the example media items may be a collection of links or pointers (i.e. URI) to the underlying data for media items that are stored elsewhere, such as the audio sources 662 and 664. In another embodiment, the media items may include pointers to media content stored on the local zone player, another zone player over a local network, or a controller device connected to the local network.

As shown, the example network 600 may also include an example queue 602 associated with the zone player 612, and an example queue 604 associated with the zone player 614. Queue 606 may be associated with a group, when in existence, comprising zone players 612 and 614. Queue 606 might comprise a new queue or exist as a renamed version of queue 602 or 604. In some embodiments, in a group, the zone players 612 and 614 would be assigned to queue 606 and queue 602 and 604 would not be available at that time. In some embodiments, when the group is no longer in existence, queue 606 is no longer available. Each zone player and each combination of zone players in a network of zone players, such as those shown in FIG. 1 or that of example zone players 612, 614, and example combination 616, may be uniquely assigned to a corresponding playback queue.

A playback queue, such as playback queues 602-606, may include identification of media content to be played by the corresponding zone player or combination of zone players. As such, media items added to the playback queue are to be played by the corresponding zone player or combination of zone players. The zone player may be configured to play items in the queue according to a specific order (such as an order in which the items were added), in a random order, or in some other order.

The playback queue may include a combination of playlists and other media items added to the queue. In one embodiment, the items in playback queue 602 to be played by the zone player 612 may include items from the audio sources 662, 664, or any of the media items 622-632. The playback queue 602 may also include items stored locally on the zone player 612, or items accessible from the zone player 614. For instance, the playback queue 602 may include Internet radio 626 and album 632 items from audio source 662, and items stored on the zone player 612.

When a media item is added to the queue via an interface of a controller, a link to the item may be added to the queue. In a case of adding a playlist to the queue, links to the media items in the playlist may be provided to the queue. For example, the playback queue 602 may include pointers from the Internet radio 626 and album 632, pointers to items on the audio source 662, and pointers to items on the zone player 612. In another case, a link to the playlist, for example, rather than a link to the media items in the playlist may be provided to the queue, and the zone player or combination of zone players may play the media items in the playlist by accessing the media items via the playlist. For example, the album 632 may include pointers to items stored on audio source 662. Rather than adding links to the items on audio source 662, a link to the album 632 may be added to the playback queue 602, such that the zone player 612 may play the items on the audio source 662 by accessing the items via pointers in the album 632.

In some cases, contents as they exist at a point in time within a playback queue may be stored as a playlist, and subsequently added to the same queue later or added to another queue. For example, contents of the playback queue 602, at a particular point in time, may be saved as a playlist, stored locally on the zone player 612 and/or on the cloud network. The saved playlist may then be added to playback queue 604 to be played by zone player 614.

VI. EXAMPLE AD-HOC NETWORK

Figure 7:
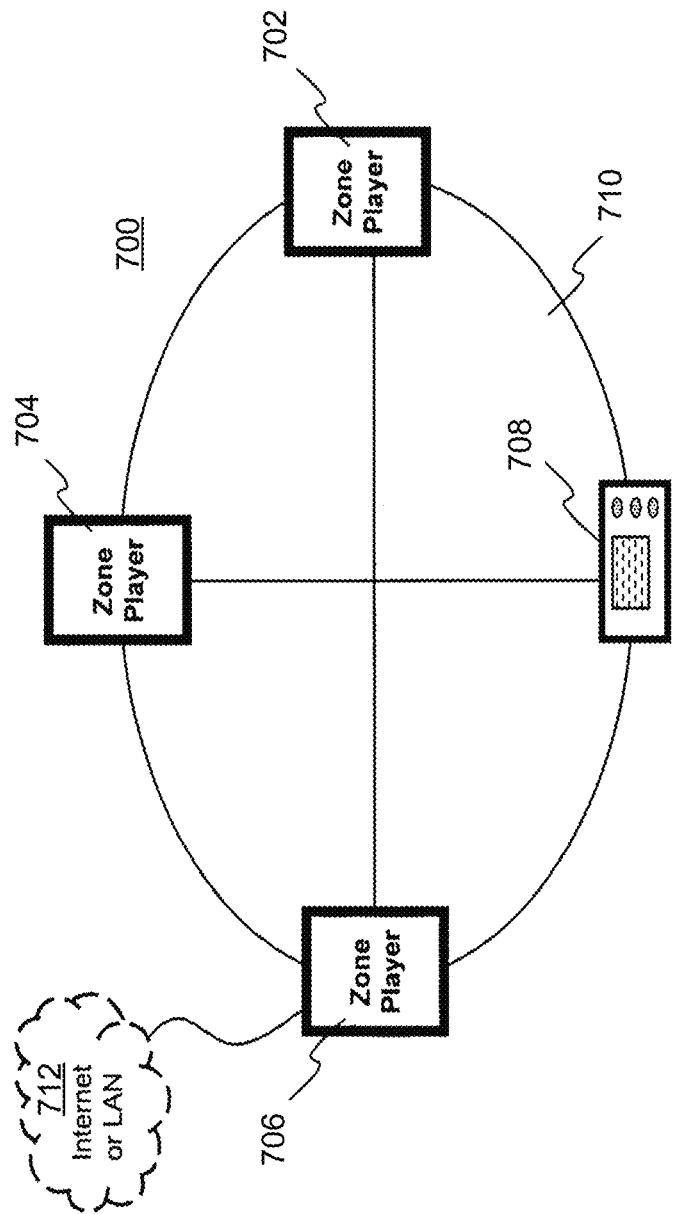
FIG. 7 shows an example ad-hoc playback network.

Particular examples are now provided in connection with FIG. 7 to describe, for purposes of illustration, certain embodiments to provide and facilitate connection to a playback network. FIG. 7 shows that there are three zone players 702, 704 and 706 and a controller 708 that form a network branch that is also referred to as an Ad-Hoc network 710. The network 710 may be wireless, wired, or a combination of wired and wireless technologies. In general, an Ad-Hoc (or "spontaneous") network is a local area network or other small network in which there is generally no one access point for all traffic. With an established Ad-Hoc network 710, the devices 702, 704, 706 and 708 can all communicate with each other in a "peer-to-peer" style of communication, for example. Furthermore, devices may join and/or leave from the network 710, and the network 710 will automatically reconfigure itself without needing the user to reconfigure the network 710. While an Ad-Hoc network is referenced in FIG. 7, it is understood that a playback network may be based on a type of network that is completely or partially different from an Ad-Hoc network.

Using the Ad-Hoc network 710, the devices 702, 704, 706, and 708 can share or exchange one or more audio sources and be dynamically grouped (or ungrouped) to play the same or different audio sources. For example, the devices 702 and 704 are grouped to playback one piece of music, and at the same time, the device 706 plays back another piece of music. In other words, the devices 702, 704, 706 and 708, as shown in FIG. 7, form a HOUSEHOLD that distributes audio and/or reproduces sound. As used herein, the term HOUSEHOLD (provided in uppercase letters to disambiguate from the user's domicile) is used to represent a collection of networked devices that are cooperating to provide an application or service. An instance of a HOUSEHOLD is identified with a household 710 (or household identifier), though a HOUSEHOLD may be identified with a different area or place.

In certain embodiments, a household identifier (HHID) is a short string or an identifier that is computer-generated to help ensure that it is unique. Accordingly, the network 710 can be characterized by a unique HHID and a unique set of configuration variables or parameters, such as channels (e.g., respective frequency bands), service set identifier (SSID) (a sequence of alphanumeric characters as a name of a wireless network), and WEP keys (wired equivalent privacy) or other security keys. In certain embodiments, SSID is set to be the same as HHID.

In certain embodiments, each HOUSEHOLD includes two types of network nodes: a control point (CP) and a zone player (ZP). The control point controls an overall network setup process and sequencing, including an automatic generation of required network parameters (e.g., security keys). In an embodiment, the CP also provides the user with a HOUSEHOLD configuration user interface. The CP function can be provided by a computer running a CP application module, or by a handheld controller (e.g., the controller 308) also running a CP application module, for example. The zone player is any other device on the network that is placed to participate in the automatic configuration process. The ZP, as a notation used herein, includes the controller 308 or a computing device, for example. In some embodiments, the functionality, or certain parts of the functionality, in both the CP and the ZP are combined at a single node (e.g., a ZP contains a CP or vice-versa).

In certain embodiments, configuration of a HOUSEHOLD involves multiple CPs and ZPs that rendezvous and establish a known configuration such that they can use a standard networking protocol (e.g., IP over Wired or Wireless Ethernet) for communication. In an embodiment, two types of networks/protocols are employed: Ethernet 802.3 and Wireless 802.11g. Interconnections between a CP and a ZP can use either of the networks/protocols. A device in the system as a member of a HOUSEHOLD can connect to both networks simultaneously.

In an environment that has both networks in use, it is assumed that at least one device in a system is connected to both as a bridging device, thus providing bridging services between wired/wireless networks for others. The zone player 706 in FIG. 7 is shown to be connected to both networks, for example. The connectivity to the network 712 is based on Ethernet and/or Wireless, while the connectivity to other devices 702, 704 and 708 is based on Wireless and Ethernet if so desired.

It is understood, however, that in some embodiments each zone player 706, 704, 702 may access the Internet when retrieving media from the cloud (e.g., the Internet) via the bridging device. For example, zone player 702 may contain a uniform resource locator (URL) that specifies an address to a particular audio track in the cloud. Using the URL, the zone player 702 may retrieve the audio track from the cloud, and ultimately play the audio out of one or more zone players.

VII. ANOTHER EXAMPLE SYSTEM CONFIGURATION

Figure 8:
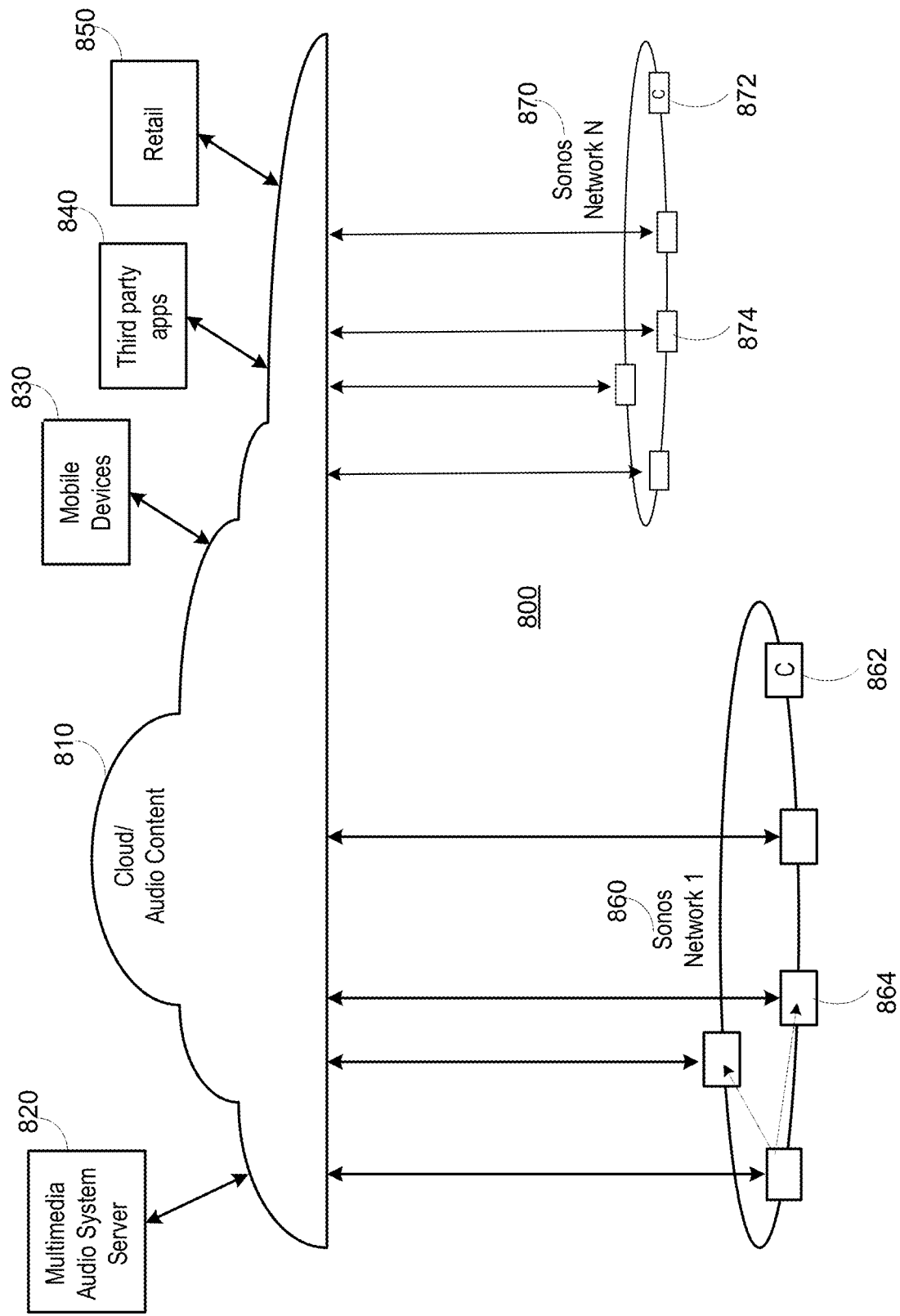
FIG. 8 shows a system including a plurality of networks including a cloud-based network and at least one local playback network.

FIG. 8 shows a system 800 including a plurality of interconnected networks including a cloud-based network and at least one local playback network. A local playback network includes a plurality of playback devices or players, though it is understood that the playback network may contain only one playback device. In certain embodiments, each player has an ability to retrieve its content for playback. Control and content retrieval can be distributed or centralized, for example. Input can include streaming content provider input, third party application input, mobile device input, user input, and/or other playback network input into the cloud for local distribution and playback.

As illustrated by the example system 800 of FIG. 8, a plurality of content providers 820-850 can be connected to one or more local playback networks 860-870 via a cloud and/or other network 810. Using the cloud 810, a multimedia audio system server 820 (e.g., Sonos™), a mobile device 830, a third party application 840, a content provider 850 and so on can provide multimedia content (requested or otherwise) to local playback networks 860, 870. Within each local playback network 860, 870, a controller 862, 872 and a playback device 864, 874 can be used to playback audio content.

VIII. EXAMPLE PRIVATE QUEUE CONFIGURATION

Figure 9:
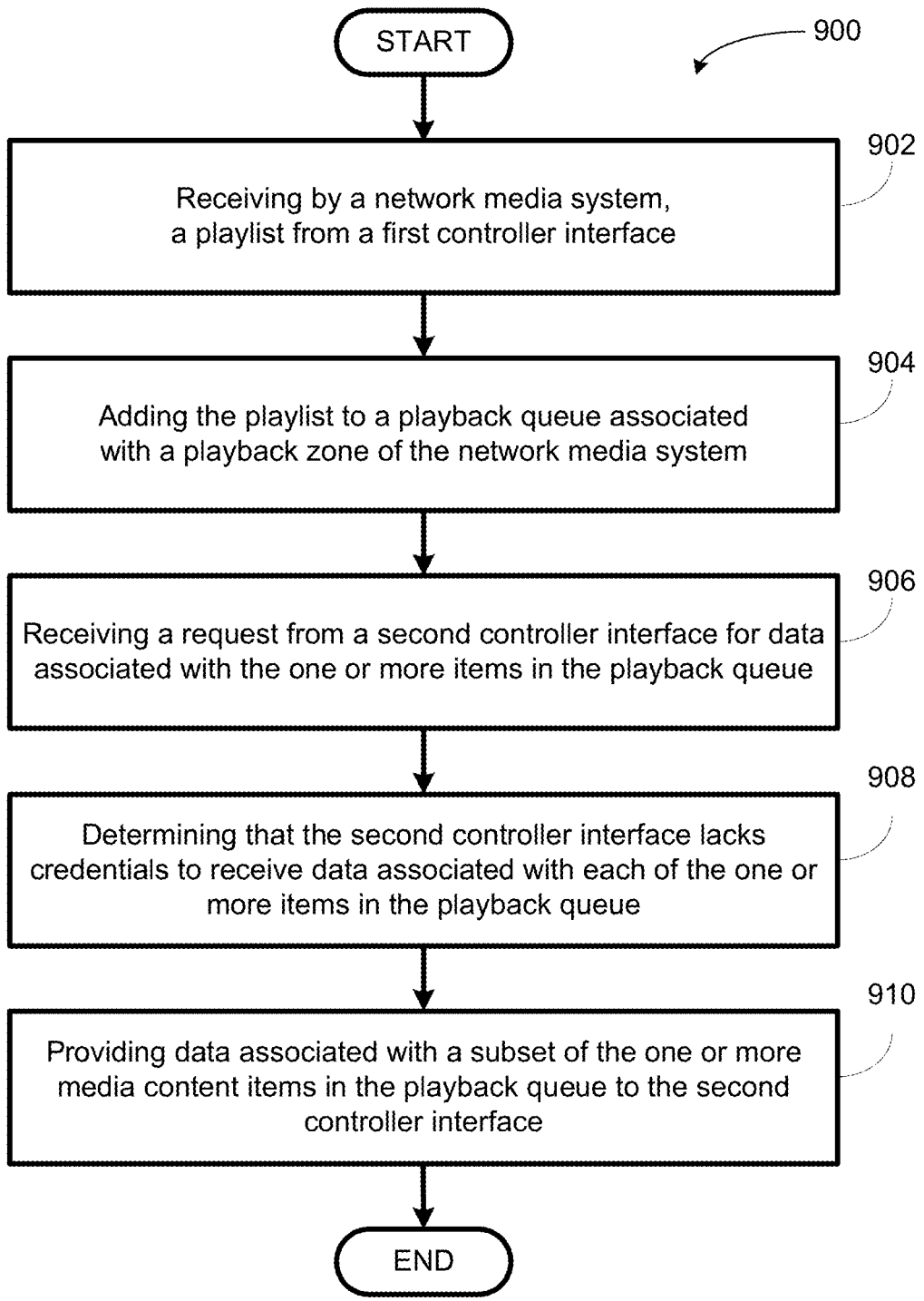
FIG. 9 shows an example flow diagram for providing a private playback queue in a media playback system.

As indicated above, the present application involves providing private playback queues in a media playback system such that users without access rights to the playback queue may not access the contents of the playback queue. In discussions herein, accessing contents of a playback queue may involve viewing or modifying one or more media items in the playback queue. FIG. 9 shows an example flow diagram 900 for providing private playback queues in a media playback system, in accordance with at least some embodiments described herein. Method 900 shown in FIG. 9 presents an embodiment of a method that could be used in the environments 100, 600, 700, and 800 with the systems 200, 202, 204, 300, 400, and 500 for example, in communication with one or more devices, such as those illustrated in FIGS. 2-5. Method 900 may include one or more operations, functions, or actions as illustrated by one or more of blocks 902-910. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 900 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 900 and other processes and methods disclosed herein, each block in FIG. 9 may represent circuitry that is wired to perform the specific logical functions in the process.

At block 902, the method 900 involves receiving by network media system a playlist responsive to an instruction via a first controller interface. In one example, the network media system may include one or more zones, each including one or more playback devices. The one or more playback devices may include zone players by SONOS, Inc., as identified previously. As discussed in connection to FIG. 7, each zone of the network media system may have an associated playback queue, established to contain information identifying one or more media items to be played by the zone. In some cases, a particular playback queue may be coupled to each zone in the network media system. The particular playback queue may be stored locally on one or more of the one or more playback devices in the zone, or stored remotely on a server accessible by the one or more playback devices in the zone.

The first controller interface may be provided on the controller 130 as discussed above, in the form of an application running on any network-enabled device. In one case, the first controller interface may be an application associated with the network media system, such as a controller application for SONOS zone players. In another case, the first controller interface may be an application associated with a music service accessible by the network media system, such as an application for SPOTIFY™ or SONGZA™.

The received playlist may identify one or more media items that are available for playback. As suggested above, the playlist may be a collection of links or pointers (i.e. URI) to the one or more media items that may be stored in one or more different locations, such as on a device providing the first controller interface, a device providing other controller interfaces that may access the network media system, on one or more of the playback devices in the zone, on a local network storage device, or on a cloud network which may include a remote server accessible over the Internet. Alternatively, the playlist may include the one or more media items themselves. Similarly, the playlist may be received from one or more of the different locations. In some cases, the playlist and the one or more media items may be at least partially received from the same location. In other cases, the playlist and the one or more media items may be received from different locations. In one case, the received playlist may further be stored by the receiving first controller interface on a remote server accessible over the Internet, a device providing the first controller interface, or any device connected to the network media system, such as another device in the zone.

At block 904, the method 900 involves adding the playlist to a playback queue associated with the zone. As described above, the playback queue may be established to contain information identifying one or more media items to be played by the zone. As such, adding the playlist to a playback queue associated with the zone may involve adding information identifying the one or more playable items in the playlist to the playback queue.

In one case, the playback queue associated with the zone may be empty when the playlist is added. In this case, adding the playlist to the playback queue may involve populating the playback queue with information identifying the one or more playable times in the playlist.

In another case, the playback queue may already have one or more media items when the playlist is added. In the case the playback queue already has a media item, information identifying the one or more playable items in the playlist may be added before or after information identifying the media item already in the playback queue, such that the playable items from the playlist that have been added to the queue may be played by the zone before or after the media item already in the queue, respectively. In a further case, items from the playlist may be added and distributed among the media items already in the playback queue. For instance, the queue may be ordered alphabetically according to track title. As such, media items from the playlist may be added to the playback queue at the corresponding alphabetically ordered queue position.

At block 906, the method 900 involves receiving a request from a second controller interface for the information identifying the one or more items in the playback queue. As with the first controller interface, the second controller interface may be provided on the controller 130 as discussed above, in the form of an application running on any network-enabled device. Accordingly, the second controller interface may similarly be an application associated with the network media system, such as a controller application for SONOS zone players, or an application associated with a music service accessible by the network media system, such as an application for SPOTIFY™ or SONGZA™. In one embodiment, the first controller interface may be associated with a music service accessible by the network media system to provide the one or more media items in the playlist, while the second controller interface may be associated with the network media system.

In one example, the second controller interface may be accessed by another user who may be interested in viewing and potentially modifying the playback queue of the zone. In some cases, as previously indicated, the playback queue may be stored in the form of a state variable on one or more playback devices in the zone associated with the playback queue. As such, the request from the second controller interface for information identifying the one or more items in the playback queue may involve a request for a state variable of one or more devices in the zone.

At block 908, method 900 involves determining that the second controller interface lacks credentials to receive the information identifying the one or more items in the playback queue. In one example, determining that the second controller interface lacks credentials to receive information identifying each of the one or more media items in the playback queue may further involve receiving a credential from the second controller interface, comparing the received credential to an access criteria, such as a credential of the first controller interface, and determining a subset of the information identifying one or more items in the playback queue based on the received credential. In one case, the credential from the second controller interface may be received along with the request from the second controller interface for information identifying the one or more items in the playback queue.

The credentials of the first and second controller interfaces may identify one or more music services the respective controller interfaces may have access to, and from which media items may be accessed by the network media system to be played by the zone. For example, the credential of the first controller interface may identify SPOTIFY™ and RHAPSODY™ as music services accessible via the first controller interface such that the first controller interface may be accessed to cause media items from SPOTIFY™ and RHAPSODY™ to be played by the zone. In this example, the credential of the second controller interface may identify SPOTIFY™ and PANDORA™ as music services accessible via the second controller interface such that the second controller interface may be accessed to cause media items from SPOTIFY™ and PANDORA™ to be played by the zone. The credentials of the first and second controller interfaces may also identify users of the first and second controller interface. For instance, the credential of the first controller interface may identify the first user, and the credential of the second controller interface may identify a second user attempting to access the playback queue via the second controller interface. The credentials of the first and second controller interfaces may also identify the devices the controller interfaces are provided on.

The credential received from the second controller interface may then be compared against a set of access criteria. For instance, the network media system may be configured such that only the first user who added media items to the playback queue can access the added media items. In such a case, the access criteria may include the credential of the first controller interface from which the first user added media items to the playback queue, and the second controller interface may only access the media items in the playback queue if the criteria from the second controller interface matches the criteria of the first controller interface.

The credential received from the second controller interface may further be used to determine a subset of the information identifying one or more items in the playback queue. In one example, one or more users of the network media system other than the first user may be provided access to media items in the playback queue. In this case, the access criteria may include one or more user identifiers such that if a user identifier included in the credential received from the second controller interface matches one of the one or more user identifiers included in the access criteria, then the second controller interface may access the media items added by the first user to the playback queue. Along similar lines, different groups of users may be provided different levels of access. For instance, a first group of users may have a credential to both view and modify media items added by the first user to the playback queue, and a second group of users may have a credential to only view media items added by the first user to the playback queue. In a further example, a third group of users may have a credential to only view content in the playback queue that is currently playing and/or content in the queue to be played next. Other example levels of access are possible.

In another example, the network media system may be configured such that only users with access to the same music service from which the media items were added to the playback queue may access the playback queue. In such a case, the access criteria may include one or more music services from which media items was added. Accordingly, if the credential received from the second controller interface identifies the one or more music services, then the second controller interface may access the playback queue. In this case, if the playback queue includes media items from multiple music services, then the second controller interface may access only the media items that were added to the playback queue from music services the second controller interface has access to.

In a further example, a combination of the user identifier and music service identifier in the credential received from the second controller interface may be used to determine the subset of the information identifying media items in the playback queue. For instance, the credential received from the second controller interface may include a user identifier that has access to view media items in the queue currently being played by the zone as well as a media item next in the queue. However, access criteria for accessing the media content in the queue may also include a music service identifier, such as SPOTIFY™, such that the second controller interface may only access media items added to the queue from SPOTIFY™, if the second controller interface also has access to SPOTIFY™. As such, if the credential received from the second controller interface does not include a music service identifier for SPOTIFY™, the second controller interface may not be able to view media items currently playing if the media item currently playing was added to the playback queue from SPOTIFY™.

As previously suggested, example subsets of the information identifying one or more items in the playback queue may include any combination of one or more of the following: information identifying an item currently being played by the zone, information identifying an item to be played next by the zone, and information identifying items in the playback queue not in the playlist. Other examples are also possible.

Upon determining the subset of the information identifying one or more items in the playback queue that the second controller interface has access to, block 910 of the method 900 involves providing the information identifying a subset of the one or more items in the playback queue to the second controller interface. FIGS. 10A-10D show example media playback system interfaces for a private playback queue, such as ones that may be provided on the second controller interface, as discussed herein.

Figures 10A, 10B:
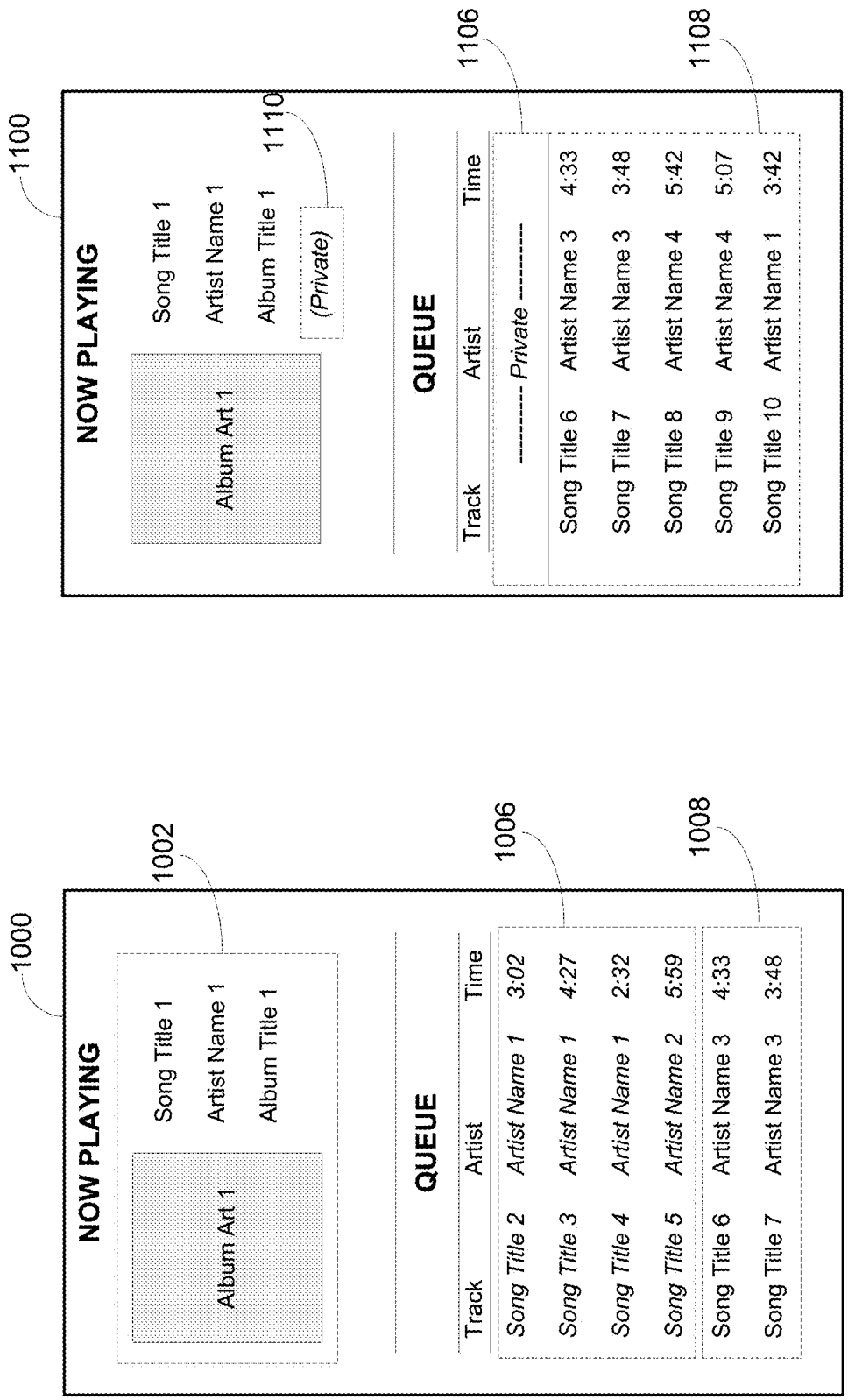
FIG. 10A shows a first example media playback system interface showing a private playback queue.
FIG. 10B shows a second example media playback system interface showing a private playback queue.

FIG. 10A shows a first example media playback system interface 1000 showing a private playback queue. As shown, the interface 1000 may provide information 1002 identifying a media item currently being played, information 1006 identifying media items of a playlist added to the playback queue via the first controller interface, and information 1008 identifying media items in the playback queue not from the playlist added to the playback queue. In this example, the second controller interface may have the credential to view information for all items in the playback queue, whether or not the items were added to the playback queue via the first controller interface. In some cases, the items in the playback queue that were added from the playlist may be provided in a different text or with a different emphasis. In the case of the interface 1000, information 1006 on items in the playback queue added from the playlist are provided in italicized text.

FIG. 10B shows a second example media playback system interface 1100 showing a private playback queue. As shown, the interface 1100 may provide information 1106 indicating that the playback queue includes media items from a playlist that was added to the queue via the first controller interface, and that is private from the second controller interface 1100. The interface 1100 may also provide information 1108 identifying media items in the playback queue not added to the playback queue from the playlist. In this example, the interface 1100 may also provide an indication 1110 that the media item currently being played is a media item added to the queue as part of the playlist that was added to the queue via the first controller interface. In some example embodiments, indication 1110 may further identify the service, user, or first controller that was used to add the media items to the queue.

FIG. 10C shows a third example media playback system interface 1200 showing a private playback queue. As shown, the interface 1200 may provide information 1206 indicating that the playback queue includes media items from a playlist that was added to the queue via the first controller interface, and that is at least partially private from the second controller interface 1100. In this case, information 1206 indicates the next media item in the queue, as well as the total number and playback duration of other media items that were added to the queue when the playlist was added to the queue via the first controller interface. The interface 1200 also provides information 1208 identifying media items in the playback queue not from the playlist added to the playback queue. Analogous to the case of interface 1000, where the items in the playback queue that were added from the playlist may be provided in a different text, the information 1208 may also be provided in different text or emphasis. In this case, the information 1208 may be provided in bold text.

FIG. 10D shows a fourth example media playback system interface 1300 showing a private playback queue. As shown, the interface 1300 may provide information 1306 identifying media items of a playlist added to the playback queue via the first controller interface, and information 1310 identifying media items in the playback queue not from the playlist added to the playback queue. In addition, the interface 1300 may also provide graphical indicators 1308 and 1312 identifying media item in the queue that may or may not be modified. In other words, while the second controller interface may have the credential to view all the items in the queue, the second controller interface may not have the credential to modify certain, if any of the items in the queue. In the case of interface 1300, the indicator 1308 may indicate the media item currently being rendered may not be removed from the queue. Similarly, the indicator 1312 may indicate which of the media items from the playlist that was added to the queue via the first controller interface may be removed or reordered via the second controller interface. Other examples that may not have been described herein may also be possible.

IX. Conclusion

The descriptions above disclose various example systems, methods, apparatus, and articles of manufacture including, among other components, firmware and/or software executed on hardware. However, such examples are merely illustrative and should not be considered as limiting. For example, it is contemplated that any or all of these firmware, hardware, and/or software components can be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

As suggested above, the present application involves providing private playback queues in a media playback system such that users without access rights to the playback queue may not access the contents of the playback queue. The method involves receiving by a network media system a playlist responsive to an instruction via a first controller interface. The network media system comprises a zone that includes a playback device and a playback queue. The playlist identifies one or more media items that are available for playback. The method further involves adding the playlist to a playback queue associated with the zone. The playback queue is established to contain information identifying one or more media items to be played by the zone. The method also involves receiving a request from a second controller interface for the information identifying the one or more items in the playback queue, determining that the second controller interface lacks a credentials to receive the information identifying the one or more items in the playback queue, and providing the information identifying a subset of the one or more items in the playback queue to the second controller interface.

In another aspect, a non-transitory computer readable memory is provided. The non-transitory computer readable memory has stored thereon instructions executable by a computing device to cause the computing device to execute functions. The functions include receiving at a by network media system a playlist responsive to an instruction via a first controller interface. The network media system comprises a zone that includes a playback device and a playback queue. The playlist identifies one or more media items that are available for playback. The functions further involve adding the playlist to a playback queue associated with the zone. The playback queue is established to contain information identifying one or more media items to be played by the zone. The functions also involve receiving a request from a second controller interface for the information identifying the one or more items in the playback queue, determining that the second controller interface lacks a credentials to receive the information identifying the one or more items in the playback queue, and providing the information identifying a subset of the one or more items in the playback queue to the second controller interface.

In another aspect, a device is provided. The device includes a processor and computer readable medium having stored thereon instructions executable by the processor to perform function. The functions include receiving by a network media system a playlist responsive to an instruction via a first controller interface. The network media system comprises a zone that includes a playback device and a playback queue. The playlist identifies one or more media items that are available for playback. The functions further involve adding the playlist to a playback queue associated with the zone. The playback queue is established to contain information identifying one or more media items to be played by the zone. The functions also involve receiving a request from a second controller interface for the information identifying the one or more items in the playback queue, determining that the second controller interface lacks a credentials to receive the information identifying the one or more items in the playback queue, and providing the information identifying a subset of the one or more items in the playback queue to the second controller interface.

Additionally, references herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

The invention claimed is:

1. A computing system comprising:
   at least one processor;
   at least one non-transitory computer-readable medium; and
   program instructions stored on the at least one non-transitory computer-readable medium that are executable by the at least one processor such that the computing system is configured to:
   receive, from a first controller device, first instructions to define settings for a first access level for a playback queue, wherein the first access level (i) allows for adding media items to the playback queue and (ii) allows for defining settings for a second access level for the playback queue, wherein the second access level (i) allows for adding media items to the playback queue and (ii) allows for accessing contents of the playback queue based on the settings for the second access level defined via the first access level;
   execute the first instructions to define the settings for first access level;
   receive, from the first controller device, a first credential associated with a first user of the first controller device;
   based on the first credential, determine that the first access level applies to the first user;
   receive, from the first controller device, second instructions to define the settings for the second access level;
   based on determining that the first access level applies to the first user, execute the second instructions to define the settings for the second access level;
   receive, from a second controller device, a second credential associated with a second user of the second controller device; and
   based on the second credential:
     determine that the second access level applies to the second user;
     transmit an indication of the defined settings for the second access level to the second controller device; and
     cause a graphical indication of the settings for the second access level defined via the first access level to be displayed on an interface of the second controller device.

2. The computing system of claim 1, wherein accessing contents of the playback queue based on the defined settings for the second access level comprises modifying the playback queue based on the defined settings for the second access level.

3. The computing system of claim 2, wherein modifying the playback queue comprises one or more of (i) changing a volume level of playback of a given media item within the playback queue, (ii) starting playback of the given media item, (iii) pausing playback of the given media item, (iv) stopping playback of the given media item, or (v) skipping all or a portion of playback of the given media item.

4. The computing system of claim 2, wherein modifying the playback queue comprises one or more of (i) removing one or more media items from the playback queue or (ii) reordering one or more media items within the playback queue.

5. The computing system of claim 1, wherein accessing contents of the playback queue based on the defined settings for the second access level comprises viewing one or more media items of the playback queue based on the defined settings for the second access level.

6. The computing system of claim 1, wherein the defined settings for the second access level restrict control of playback of one or more media items within the playback queue.

7. The computing system of claim 6,
   wherein the graphical indication of the defined settings for the second access level includes an indication that the second controller device is restricted from controlling playback of one or more media items within the playback queue.

8. The computing system of claim 1, further comprising program instructions stored on the at least one non-transitory computer-readable medium that are executable by the at least one processor such that the computing system is configured to:
   receive, from the second controller device, third instructions to add a given media item to the playback queue; and
   based on the second access level, execute the third instructions to add the given media item to the playback queue.

9. A non-transitory computer-readable medium, wherein the non-transitory computer-readable medium is provisioned with program instructions that, when executed by at least one processor, cause a computing system to:
   receive, from a first controller device, first instructions to define settings for a first access level for a playback queue, wherein the first access level (i) allows for adding media items to the playback queue and (ii) allows for defining settings for a second access level for the playback queue, wherein the second access level (i) allows for adding media items to the playback queue and (ii) allows for accessing contents of the playback queue based on the settings for the second access level defined via the first access level;

execute the first instructions to define the settings for first access level;

receive, from the first controller device, a first credential associated with a first user of the first controller device;

based on the first credential, determine that the first access level applies to the first user;

receive, from the first controller device, second instructions to define the settings for the second access level;

based on determining that the first access level applies to the first user, execute the second instructions to define the settings for the second access level;

receive, from a second controller device, a second credential associated with a second user of the second controller device; and based on the second credential:
   determine that the second access level applies to the second user;
   transmit an indication of the defined settings for the second access level to the second controller device; and
   cause a graphical indication of the settings for the second access level defined via the first access level to be displayed on an interface of the second controller device.

10. The non-transitory computer-readable medium of claim 9, wherein accessing contents of the playback queue based on the defined settings for the second access level comprises modifying the playback queue based on the defined settings for the second access level.

11. The non-transitory computer-readable medium of claim 10, wherein modifying the playback queue comprises one or more of (i) changing a volume level of playback of a given media item within the playback queue, (ii) starting playback of the given media item, (iii) pausing playback of the given media item, (iv) stopping playback of the given media item, or (v) skipping all or a portion of playback of the given media item.

12. The non-transitory computer-readable medium of claim 10, wherein modifying the playback queue comprises one or more of (i) removing one or more media items from the playback queue or (ii) reordering one or more media items within the playback queue.

13. The non-transitory computer-readable medium of claim 9, wherein accessing contents of the playback queue based on the defined settings for the second access level comprises viewing one or more media items of the playback queue based on the defined settings for the second access level.

14. The non-transitory computer-readable medium of claim 9, wherein the defined settings for the second access level restrict control of playback of one or more media items within the playback queue.

15. The non-transitory computer-readable medium of claim 14, wherein
   the graphical indication of the defined settings for the second access level includes an indication that the second controller device is restricted from controlling playback of one or more media items within the playback queue.

16. The non-transitory computer-readable medium of claim 9, wherein the non-transitory computer-readable medium is also provisioned with program instructions that, when executed by at least one processor, cause the computing system to:
   receive, from the second controller device, third instructions to add a given media item to the playback queue; and
   based on the second access level, execute the third instructions to add the given media item to the playback queue.

17. A method implemented by a computing system, the method comprising:
   receiving, from a first controller device, first instructions to define settings for a first access level for a playback queue, wherein the first access level (i) allows for adding media items to the playback queue and (ii) allows for defining settings for a second access level for the playback queue, wherein the second access level (i) allows for adding media items to the playback queue and (ii) allows for accessing contents of the playback queue based on the settings for the second access level defined via the first access level;
   executing the first instructions to define the settings for first access level;
   receiving, from the first controller device, a first credential associated with a first user of the first controller device;
   based on the first credential, determining that the first access level applies to the first user;
   receiving, from the first controller device, second instructions to define the settings for the second access level;
   based on determining that the first access level applies to the first user, executing the second instructions to define the settings for the second access level;
   receiving, from a second controller device, a second credential associated with a second user of the second controller device; and
   based on the second credential:
      determining that the second access level applies to the second user;
      transmitting an indication of the defined settings for the second access level to the second controller device; and
      causing a graphical indication of the settings for the second access level defined via the first access level to be displayed on an interface of the second controller device.

18. The method of claim 17, wherein accessing contents of the playback queue based on the defined settings for the second access level comprises modifying the playback queue based on the defined settings for the second access level.

19. The method of claim 18, wherein modifying the playback queue comprises one or more of (i) changing a volume level of playback of a given media item within the playback queue, (ii) starting playback of the given media item, (iii) pausing playback of the given media item, (iv) stopping playback of the given media item, or (v) skipping all or a portion of playback of the given media item.

20. The method of claim 18, wherein modifying the playback queue comprises one or more of (i) removing one or more media items from the playback queue or (ii) reordering one or more media items within the playback queue.

* * * * *